United States Patent
Waterlot et al.

(10) Patent No.: US 10,482,195 B2
(45) Date of Patent: Nov. 19, 2019

(54) MANAGEMENT METHOD OF AN ELECTRIC INSTALLATION AND MANAGEMENT SYSTEM OF ONE SUCH INSTALLATION

(71) Applicant: SCHNEIDER ELECTRIC INDUSTRIES SAS, Rueil-Malmaison (FR)

(72) Inventors: Frederic Waterlot, Saint Baldoph (FR); Erick Contini, Meylan (FR); Christian Barocci, St. Marcelin (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 497 days.

(21) Appl. No.: 14/570,195

(22) Filed: Dec. 15, 2014

(65) Prior Publication Data

US 2015/0169806 A1 Jun. 18, 2015

(30) Foreign Application Priority Data

Dec. 16, 2013 (FR) ...................................... 13 62670

(51) Int. Cl.
*G06F 17/50* (2006.01)

(52) U.S. Cl.
CPC ................................ *G06F 17/5009* (2013.01)

(58) Field of Classification Search
CPC ............... G06F 17/5009; G06F 17/509; G06F 2217/36; H02G 3/00; H02G 3/0431; H02G 3/105; H02G 3/34
See application file for complete search history.

(56) References Cited

U.S. PATENT DOCUMENTS

| 4,275,449 A | * | 6/1981 | Aish | ....................... G06F 3/033 345/420 |
| 2009/0219145 A1 | * | 9/2009 | Wong | .................... H04W 4/029 340/286.02 |
| 2010/0280674 A1 | * | 11/2010 | Jalili | ...................... G01D 4/002 700/295 |

FOREIGN PATENT DOCUMENTS

CN 203193662 U 9/2013

OTHER PUBLICATIONS

French Preliminary Search Report dated Sep. 8, 2014, in French Application No. 13 62670 filed Dec. 16, 2013 (with English Translation of Categories of Cited Documents).

(Continued)

*Primary Examiner* — James J Yang
(74) *Attorney, Agent, or Firm* — Oblon, McClelland, Maier & Neustadt, L.L.P.

(57) ABSTRACT

In this installation management method for managing an electrical installation, the electrical installation comprises a plurality of electrical elements and each element comprises a first memory storage means for storing a unique identifier associated with said element. This method includes a step of acquisition, via an identification means, of the first identifier of each element belonging to the installation. Each first memory storage means is also capable of saving and storing geometrical data of the corresponding element, the said data being acquired during the data acquisition step, via the identification means, and associated with the corresponding first identifier. The method further includes a step of computation, via a computing unit, of a modelling of the electrical installation based on the geometrical data acquired.

11 Claims, 2 Drawing Sheets

(56) References Cited

OTHER PUBLICATIONS

Young-Il Kim, et al., "Implementing a Prototype System for Power Facility Management using RFID/WSN", Proceedings of World Academy of Science, Engineering and Technology, Turkey, vol. 16, 2006, 6 pgs.
Dirk Henrici, et al., "Data Storage in RFID Systems", Radio Frequency Identification Fundamentals and Applications, Bringing Research to Practice, INTECH, Feb. 1, 2010, 17 pgs.
Extended European Search Report dated May 11, 2015 in European Patent Application No. 14197939.9 (with English translation of Category of Cited Documents), 7 pages.

\* cited by examiner

MANAGEMENT METHOD OF AN ELECTRIC INSTALLATION AND MANAGEMENT SYSTEM OF ONE SUCH INSTALLATION

This invention relates to an installation management method for managing an electrical installation comprising a plurality of electrical elements adapted to ensure the flow of a current from a point of origin to a point of electrical distribution and a management system for managing such an electrical installation.

In the field of electrical installations, it is a known practice to use a plurality of electrical elements forming the electrical installation and that enable electrical power distribution. The electrical elements, also referred to as prefabricated elements, are components such as electrical power supply units, electrical power transmission elements, electrical power distribution elements comprising one or more tap off outlets. These installations are classified as prefabricated electrical installations and are suitable to be used in buildings such as industrial, commercial or office buildings, etc.

During the installing or setting in position of these installations, it is a known practice to install the various constituent elements thereof in accordance with a predefined template developed in the engineering—design department, each element comprising a storage tag for storing a unique identifier, capable of being read via a tag reader. It is thus possible to determine the number of elements arranged in the building during the installing or setting in position of the installation and the constituent elements forming the said installation.

However, with such an installation, when a supplementary element is required that is additional to the model template developed in the engineering-design department, the model template must be updated manually. The management of the electrical installation is thus performed manually, and its configuration is static. It is thus complex and expensive to modify and to manage the electrical installation.

The aim of the invention is therefore to provide a management method for managing an electrical installation that enables the dynamic and improved management of the electrical installation.

To this end, the object of the invention relates to an installation management method for managing an electrical installation comprising a plurality of electrical elements in order to ensure the flow of a current from a point of origin to a point of electrical power distribution, each element comprising a first memory storage means for storing a unique identifier associated with said first element, the method including the following step of:

a) acquisition, via an identification means, of the first identifier of each element belonging to the installation.

In accordance with the invention, the first memory storage means is also capable of saving and storing geometrical data of the corresponding element, the said data being acquired during the data acquisition step a), via the identification means, and associated with the corresponding first identifier, and the method includes in addition the following step of:

b) computation, via a computing unit, of a modelling of the electrical installation based on the geometrical data acquired.

Thanks to the invention, the computing unit is capable of modelling the electrical installation based on the geometrical data stored in the first memory storage means of each electrical element. The management method thus provides the ability to model the electrical installation after the installing in place of each element of the installation in a building and to identify the position of each element, via the geometrical data associated with each first identifier. The installation is thus modelled in a dynamic manner and any modification of the installation as compared to a pre-established model template then has the ability to be recorded, which provides the ability to ensure a simplified process of configuration and management of the electrical installation.

According to other advantageous aspects of the invention, the method includes one or more of the following characteristic features, taken into consideration individually or according to any technically permissible combinations:

during the data acquisition step a), the identification means acquires each first identifier and the associated geometrical data in accordance with an order of installing or setting in position of the elements in the electrical installation, starting from an origin point element corresponding to an electrical power supply unit, up to an end point element disposed opposite to the origin point element relative to the rest of the installation, the computation of the modelling being performed in accordance with an order of installing or setting in position of the elements;

the elements comprise at least one electrical power distribution element, the power distribution element having a predetermined number of electrical tap off outlets capable of each being connected to an electrical tap off box, while each corresponding first memory storage means includes the said number of tap off outlets, and whereas for each power distribution element the computation of the modelling is performed based on the acquired number of tap off outlets;

the electrical elements comprise at least one electrical power distribution element, each power distribution element having at least one electrical tap off outlet capable of being connected to an electrical tap off box, whereas the method includes, prior to the computing step b), the following steps:

a') the connection of one or more electrical tap off box(es) to one or more tap off outlet(s), the or each electrical tap off outlet comprising a second memory storage means for storing a unique reference number associated with the said outlet;

a") the acquisition of the reference number of each tap off outlet connected to an electrical tap off box;

following the step of reference number acquisition a"), the method includes, for each electrical tap off box, the following step:

a'") the transmission to the computing unit of the corresponding reference number and a second unique identifier associated with the electrical tap off box, the computing unit being capable during the step of computation b), of modelling each electrical tap off box and of associating it, within the modelling framework, with the position of the corresponding outlet;

subsequent to the step of computation b), the method includes the following steps:

c) the measurement, for each electrical tap off box, of one or more electrical data variables related to the electrical installation;

d) the transmission of the one or more measured data variables to the computing unit, e) the association, within the modelling framework, of the measured electrical data variables with the corresponding electrical tap off box and with its position in the electrical installation;

each first memory storage means includes a radio frequency tag, while during the data acquisition step a), the acquisition of data is carried out by means of radio electric waves;

each electrical element comprises at least two connection ends, with one thereof being a reference end, the geometrical data comprising the position of the connection ends relative to the reference end, while the computing unit is capable of calculating the position of each connection end relative to the origin point element, each electrical element comprises at least two connection ends, the geometrical data including the positions of the connection ends of the corresponding elements, in a referential frame associated with the electrical installation, the geometrical data includes information items concerning the shape or form of the corresponding element between the two connection ends.

The object of the invention also relates to an installation management system for managing an electrical installation comprising a plurality of electrical elements in order to ensure the flow of a current from a point of origin to a point of electrical distribution, each element comprising a first memory storage means for storing a first unique identifier associated with said element, the system comprising an identification means for identifying each element belonging to the installation, capable of acquiring the corresponding first identifier. In accordance with the invention, each first memory storage means is also capable of saving and storing geometrical data of the corresponding element, the identification means being capable of acquiring the geometrical data and associating them with the corresponding first identifier, whereas it in addition includes a computing unit for performing the modelling of the installation based on the geometrical data acquired by the identification means.

According to other advantageous aspects of the invention, the system further includes one or more of the following characteristic features, taken into consideration in isolation or in accordance with any technically permissible combinations:

the electrical elements comprise at least one electrical power distribution element, each power distribution element having at least one electrical tap off outlet capable of being connected to an electrical tap off box, while the or each tap off outlet comprises a second memory storage means for storing a unique reference number associated with the said tap off outlet, whereas each electrical tap off box includes an identification member capable of acquiring the reference number of the one or more tap off outlets to which the said electrical tap off box is connected;

each first and second memory storage means includes radio frequency tags capable of communicating by means of radio electric waves with the identification means and the identification member respectively.

The invention will be better understood and other advantages thereof will become more apparent in the light of the description which follows, given purely by way of non limiting example, and with reference made to the accompanying drawings in which.

Figure 1:
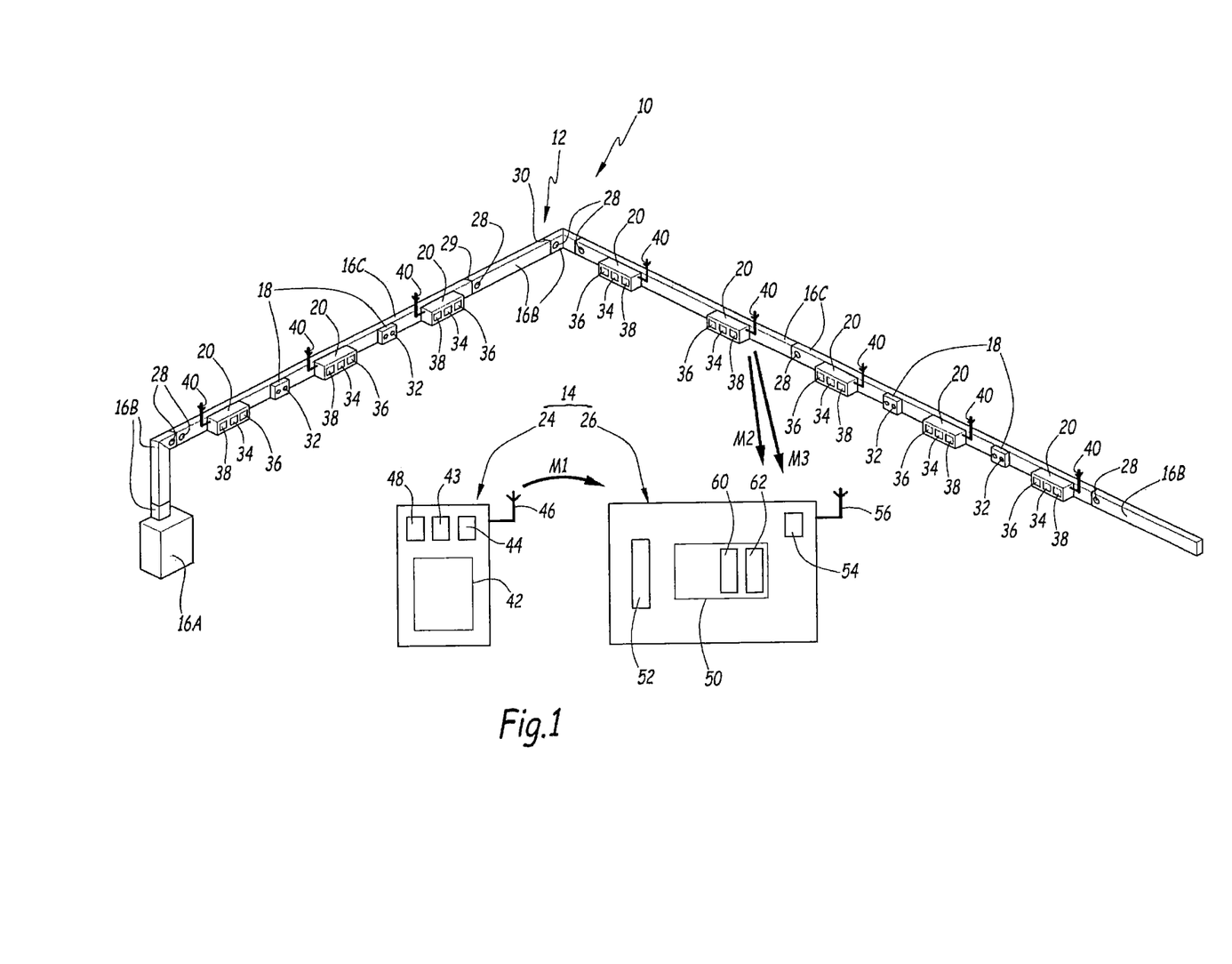
FIG. 1 is a schematic representation of an electrical assembly comprising a management system for managing an electrical installation according to the invention and the said electrical installation.

In FIG. 1, an electrical assembly 10 includes an electrical power installation 12 and a management system 14 for managing the electrical installation 12.

The electrical installation 12 includes a plurality of electrical elements 16A, 16B, 16C forming an electrical power distribution system in a building, not shown, that is to say, capable of ensuring the flow of a current from a point of origin to an electrical power distribution point. In the example shown in FIG. 1, the electrical installation 12 includes an electrical power supply unit 16A, five electrical power transmission elements 16B, similar to power transmission cables and three electrical power distribution elements 16C each comprising a plurality of electrical tap off outlets 18 capable of being connected to an electrical tap off box 20.

The management system 14 includes a mobile terminal 24 and an electronic data concentrator 26, also known as computing unit.

Each electrical element 16A, 16B, 16C comprises a first memory storage member 28 for storing a first unique identifier associated with the corresponding electrical element 16A, 16B, 16C. The electrical elements 16A, 16B, 16C are generally prefabricated electrical elements capable of being assembled with each other in order to form the electrical installation 12. Each electrical element 16A, 16B, 16C comprises two connection ends 29, 30 for connecting to another electrical element 16A, 16B, 16C.

The electrical power supply unit 16A is generally capable of delivering a low voltage, that is to say, a voltage of less than 1000 volts.

The electrical power transmission elements 16B include rectilinear elements and elements that have elbow shaped forms for the transmission of electricity within the building.

The electrical power distribution elements 16C are capable, via the electrical tap off outlets 18 and the electrical tap off boxes 20, of distributing a portion of the electrical energy, flowing through the electrical installation 12 and delivered by the power supply unit 16A, to the various electrical members to be electrically powered such as light fixtures or electrical machines, not shown. Each power distribution element 16C comprises a predetermined number of tap off outlets 18.

Each tap off outlet 18 comprises a second memory storage member 32 for storing a unique reference number associated with the corresponding outlet 18. In FIG. 1, only the free tap off outlets 18, that is to say, not connected to one of the electrical tap off boxes 20 are represented, the tap off outlets 18, connected to one of the electrical tap off boxes 20 being masked by the corresponding electrical tap off box 20.

Each electrical tap off box 20 is similar to an electrical panel connected to one of the tap off outlets 18. Each electrical tap off box 20 comprises a first identification member 34 capable of reading the second memory storage member 32 of the tap off outlet 18 with which it is associated, that is to say, capable of communicating with this second memory storage member 32, preferably by radio electric waves, in order to acquire the data contained in the second memory storage member 32. Each electrical tap off box 20 is then capable of acquiring the reference number of the tap off outlets 18 to which it is connected.

Each electrical tap off box 20 includes a sensor 36 for measuring electrical data variables relating to the electrical installation 12, such as a current flowing through the electrical tap off box or through the corresponding power distribution element 16C or even for example a voltage from the corresponding power distribution element 16C.

Each electrical tap off box 20 also includes a first radio frequency communication member 38, such as a radio transmitter—receiver and a first radio antenna 40.

The mobile terminal 24 comprises a data processing member 42, a second identification member 43, and a second radio frequency communication member 44 capable of transmitting a first message M1 to the data concentrator unit 26, via a second radio antenna 46. The mobile terminal 24 also includes a display screen 48.

The data concentrator unit 26 includes a data processing unit 50, a display member 52, a third radio frequency communication member 54 and a third radio antenna 56.

Each first memory storage member 28 is capable of storing, in addition to the first unique identifier associated with the corresponding electrical element 16A, 16B, 16C, geometrical data of the corresponding electrical element 16A, 16B, 16C. The geometrical data include the positions of the two connection ends 29, 30 of the corresponding element 16A, 16B, 16C, in a referential frame associated with the electrical installation 12.

Advantageously, the geometrical data also include information items corresponding to the shape and form of the element 16A, 16B, 16C between the two connection ends 29, 30.

Each first memory storage member 28 is capable of communicating by means of radio electric waves with the mobile terminal 24, that is to say, with the second identification member 43. Each first memory storage member 28 is for example in the form of a wireless radio frequency communication tag, such as a tag based on near field communication (NFC, from the accepted English term Near Field Communication) or an identification tag based on radio frequency (RFID, from the accepted English term Radio Frequency IDentification).

In addition, each first memory storage member 28 of each electrical power distribution element 16C contains the number of tap off outlets 18 associated with the corresponding power distribution element 16C.

Each second memory storage member 32 is for example in the form of a radio frequency tag, such as a near field communication tag (NFC) or a radio frequency identification tag (RFID).

Each identification member 34 is capable of acquiring the data contained in the second memory storage member 32, that is to say, the reference number of the corresponding tap off outlet 18.

Each first communication member 38 and the associated first radio antenna 40 capable of communicating by means of radio electric waves with the computing unit 26, and more precisely with the third radio antenna 56 and the third radio frequency communication member 54. Each first radio frequency communication member 38 is capable of transmitting a second message M2, via the first antenna 40 and to the computing unit 26.

The second message M2 includes the reference number acquired by the first identification member 34, as well as a unique address associated with each corresponding electrical tap off box 20, and enabling the identification of each electrical tap off box 20 by the computing unit 26. The unique address corresponds to a second unique identifier for each box 20.

Following the transmission of the second message M2, each first communication unit 38 is capable of transmitting, to the computing unit 26, a third message M3 comprising of the electrical data variables measured by the sensor 36, as well as the address of the corresponding electrical tap off box 20.

Advantageously, the first 38, second 44 and third 54 communication members, as well as the first 40, second 46 and third antennas 56 are in conformity with the communication protocol ZIGBEE or ZIGBEE GREEN POWER, based on the IEEE-802.15.4 standard.

The data processing unit 42 is capable of processing the data acquired by the second identification member 43.

The second identification member 43 is capable of establishing communication by means of radio electric waves with each first memory storage member 28, so as to acquire the data stored by each first memory storage member 28, that is to say, the first identifier and the associated geometrical data, as well as possibly the number of tap off outlets 18 for the power distribution elements 16C. The second identification member 43 forms a reader for each first memory storage member 28, and is for example a radio frequency tag reader.

The second identification member 43 is capable of acquiring each first identifier and the associated geometrical data following an order of installing or setting in position of the elements of the installation, that is to say, starting from an origin point element corresponding to the electrical power supply unit 16A, up to an end point element disposed opposite to the origin point element 16A relative to the rest of the electrical installation 12. The end point element, in FIG. 1, corresponds to an electrical power transmission element 16B.

The second communication member 44 is capable of transmitting the first message M1 to the computing unit 26 via the second antenna 46. The second communication member 44 is thus capable of establishing a radio link with the computing unit 26, that is to say, with the third antenna 56 and the third communication member 54.

The first message M1 includes the first identifier, the geometrical data associated with each electrical element 16A, 16B, 16C and the number of tap off outlets 18 for each power distribution element 16C. In the first message M1 the data acquired by the second identification member 43 are recorded in accordance with an order of installing or setting in position of the elements of the electrical installation 12.

The display means 48 is capable of displaying the data acquired by the second identification member 43, that is to say, the first identifier, the geometrical data for each element 16A, 16B, 16C, as well as possibly the number of tap off outlets 18 for each power distribution element 16C.

The data processing unit 50 includes a data processor 60 and a memory storage 62 associated with the processor 60.

The display unit 52 is capable of displaying the data transmitted by the mobile terminal 24 and the electrical tap off boxes 20 to the computing unit 26. The display member 52 is also capable of displaying information items computed by the processor 60.

The memory storage 62 is capable of storing a computing software application 64 for computation of a modelling of the electrical installation 12.

The computing software application 64 is capable of modelling each electrical element 16A, 16B, 16C, for which the computing unit 26 receives the first identifier via the first message M1, this modelling being a function of the geometrical data and the number of outlets that is acquired and transmitted via the first message M1. The computing software 64 is also capable of modelling each electrical tap off box 20 from which it receives the second message M2 and associating it with the corresponding tap off outlet 18.

Indeed, the reference number transmitted via the second message M2 by the electrical tap off box 20 generally comprises a certain number of digits corresponding to the first identifier of the power distribution element 16C including the corresponding tap off outlet 18, as well as another figure corresponding to the number of the electrical tap off outlet 18, that is to say, in its position on the power distribution element 16C.

The computing software application 64 is also capable, following the receipt of the third message M3, of associating, within the modelling, the electrical data variables measured by each sensor 36 with the corresponding electrical tap off box 20 and with its position in the electrical installation 12.

The operation of the management system 14 according to the invention will now be explained by making use of FIG. 2.

During an initial step 100, the mobile terminal 24, and more precisely the second identification member 43, proceeds to read each memory storage member 28, by means of radio communication, in accordance with the order of installing or setting in position of the electrical elements 16A, 16B, 16C in the electrical installation 12. The second identification member 43 then acquires each first identifier and the associated geometrical data. In addition, during this step of data acquisition 100, the second identification member 43 acquires, for each power distribution element 16C, the number of corresponding electrical tap off outlets 18.

Then, during a step 102, the mobile terminal 24 transmits the acquired data, that is to say, the first message M1, to the computing unit 26 which stores them in its memory storage 62.

Then, during the step 104, the electrical tap off boxes 20 are connected 18 to the corresponding tap off outlets, and subsequently acquire, during a step 105, via the identification member 34 the data stored in the second memory storage member 32. More precisely, the first identification members 34 and the second memory storage members 32 are positioned in a manner such that during the connection of one of the electrical tap off boxes 20 to the corresponding tap off outlet 18, the identification member 34 proceeds to read the second memory storage member 32 and the data contained therein, that is to say, the reference number of the tap off outlet 18.

During the step 106, each electrical tap off box 20 transmits to the computing unit 26 the second message M2.

Subsequently, during the step 108, the computing software application 64 is capable of computation of the modeling of the electrical installation 12 based on the data received via the first M1 and second M2 messages, that is to say, based on the geometrical data, the reference number, the first and second identifiers, and possibly also the number of tap off outlets 18 for each power distribution element 16C. The computing software application 64 performs the modelling computation also in accordance with the order of installing or setting in position of the elements 16A, 16B, 16C of the electrical installation 12, that is to say, starting from the origin point element up to the end point element, since the first message M1 includes the data sorted in the order of their acquisition. Thus, during the modelling computation step 108, the computing software application 64 models each electrical tap off box 20, and associates it, within the modelling, with the position of the corresponding tap off outlet 18.

Subsequent to the modelling step 108, the electrical installation 12 is configured, and the management system 14 is able to operate on the basis of the model developed/modelling performed. Thus, during a step 110, each electrical tap off box 20 measures the electrical data variables via its sensor 36. Then, during a step 112, each electrical tap off box 20 transmits the third message M3 to the computing unit 26.

Subsequently, during the step 114, the computation software 64 associates, within the modelling, the electrical data variables measured with the corresponding electrical tap off box 20 and with its position in the electrical installation 12. In effect, each electrical tap off box 20 is associated with an electrical tap off outlet 18 by way of knowing the reference number and the second identifier, that is to say, the address of the electrical tap off box 20.

The steps 110, 112 and 114 are repeated based on a predetermined periodic frequency, in order to enable the management system 14 to regularly ascertain and ensure the proper operation of the electrical installation 12.

Advantageously, the computing software application 64 is capable of modelling and computing in a dynamic manner the number of electrical tap off outlets connected to an electrical tap off box 20, as well as the number of free tap off outlets 18, throughout the course and process of management of the electrical installation 12. In effect, upon each instance of an electrical tap off box 20 being connected to or disconnected from a tap off outlet 18, the electrical tap off box is capable of transmitting the second message M2.

Advantageously, during the modification of the electrical installation 12 via, for example, the addition of a complementary electrical element 16A, 16B, 16C, an operator retrieves, by making use of the mobile terminal 24, the data contained in the first memory storage member 28 of the additional electrical element and then identifies the electrical elements between which is inserted the additional electrical element. The computing software 64 then reperforms the modelling computation for the electrical installation 12 in order to appropriately model the modified electrical installation.

Even more advantageously, the sensors 36 also perform voltage measurements and the computing unit 26 calculates the corresponding electrical energy and/or the electrical power.

The installation management system 14 thus makes it possible to manage in real time the availability of electrical power at any point in the electrical installation 12. In addition, the installation management system provides the ability to locate electrical consumption levels in the electrical installation 12.

The recording of data that is specific to each electrical element 16A, 16B, 16C according to the order of installing or setting in position thereof also makes it possible to model these items in the order of installing or setting in position thereof and to ensure appropriate modelling that effectively corresponds to the electrical installation 12.

The installation management system 14 enables the updating of the architecture of the electrical installation 12. In addition, through the knowledge acquired regarding the number of tap off outlets per distribution element 16C, the management system 14 provides the ability to ascertain and ensure that the number of each tap off outlet 18, comprised in the reference number is not higher than the number of electrical tap off outlets, and thus there is no error related to configuration of the system. In addition, the management system 14 makes it possible to associate all the electrical data variables measured by the electrical tap off boxes 20, with the position of the electrical tap off boxes in the installation. It is thus possible in case of a power failure, that is to say, for example when one of the electrical data variables is greater than a reference threshold value, for the system to indicate to the operator the location of the electrical fault as well as the faulty electrical element 16A, 16B, 16C involved.

Moreover, the installation management system 14 provides the ability to ensure that the modelling performed is indeed in accordance with a predetermined model template developed by the engineering-design department. The system 14 also provides the ability to manage the availability of tap off outlets 18 in real time.

The use of radio frequency tags enables the identification of each element 16A, 16B, 16C and the saving and storing of geometrical data enables better modelling of the electrical installation 12.

The installation management system 14 thus makes it possible to simplify the use and modification of the electrical installation 12. The electrical installation management system 14 provides the ability to indicate and record any modification in the configuration of the electrical installation 12, as well as to manage its operation in a more efficient manner.

By way of a variant, prior to the data acquisition step 100, once the electrical elements 16A, 16B, 16C are installed in position, the operator uses the mobile terminal 24, and sets a value for each first identifier, or even assigns an address specific to the operation of the installation management system 14, to each electrical element 16A, 16B, 16C, this address being stored in the first memory storage member 28. In this variant embodiment, during the step of data acquisition 100, the mobile terminal 24 acquires the said specific addresses or the newly set values of the first identifiers.

According to another variant embodiment, the geometrical data include the position of one of the ends 30, relative to the other end 29, forming a reference end. In this variant, the computing software application 64 is capable, during modelling of the electrical installation 12, of calculating the position of each element 16A, 16B, 16C relative to the origin point element, that is to say, the electrical power supply unit 16A in the example shown in FIG. 1. In this variant moreover, during the modelling computation, the tap off box associates for each given element 16B, 16C that is different from the origin point element 16A, the position of the end 29 of the element 16B, 16C with the position of the end 30, defined relative to the origin point element 16A, of an element 16B, 16C adjacent to the given element 16B, 16C and positioned just before the given element relative to the electrical power supply unit 16A.

According to another variant embodiment, during the data acquisition step 100, the mobile terminal 24, and more precisely the second identification member 43 acquires, for each power distribution element 16C, the data stored by the second memory storage member 32. This makes it possible to determine the number of electrical tap off outlets included in each electrical power distribution element 16C.

According to another variant embodiment, each electrical tap off box 20, and more precisely the first radio frequency communication members 38 and the first antennas 40, are in conformity with the TCP/IP communications protocol (Transmission Control Protocol/Internet Protocol), as well as the second and third communication members 44, 54 and the antennas 46, 56.

According to another variant embodiment, the data processing member 42 includes a computing software application that is similar to the computing software application 64. In this variant embodiment the mobile terminal is capable of computing and displaying the modelling output, which in particular makes it possible for the operator, during the installation and setting in position of the electrical elements, to verify and ensure that the installation appropriately corresponds to the predetermined model template, for example developed in an engineering-design department.

According to another variant embodiment, each electrical tap off box is capable of performing measurements of temperature, humidity or even any other types of measurements relating to the operation of the electrical installation 12 and of transmitting the said measurements to the data concentrator unit 26. In this variant, the computation software 64 then associates with each data variable measured the position where it was measured in the electrical installation 12.

According to another variant embodiment, the elements 16A, 16B, 16C comprise more than two connection ends.

In the description provided here above, the computing software application 64 corresponds to software instructions that form a computer programme capable of being executed by a computer. The computer corresponds, for example, to the data processing unit 50.

Figure 2:
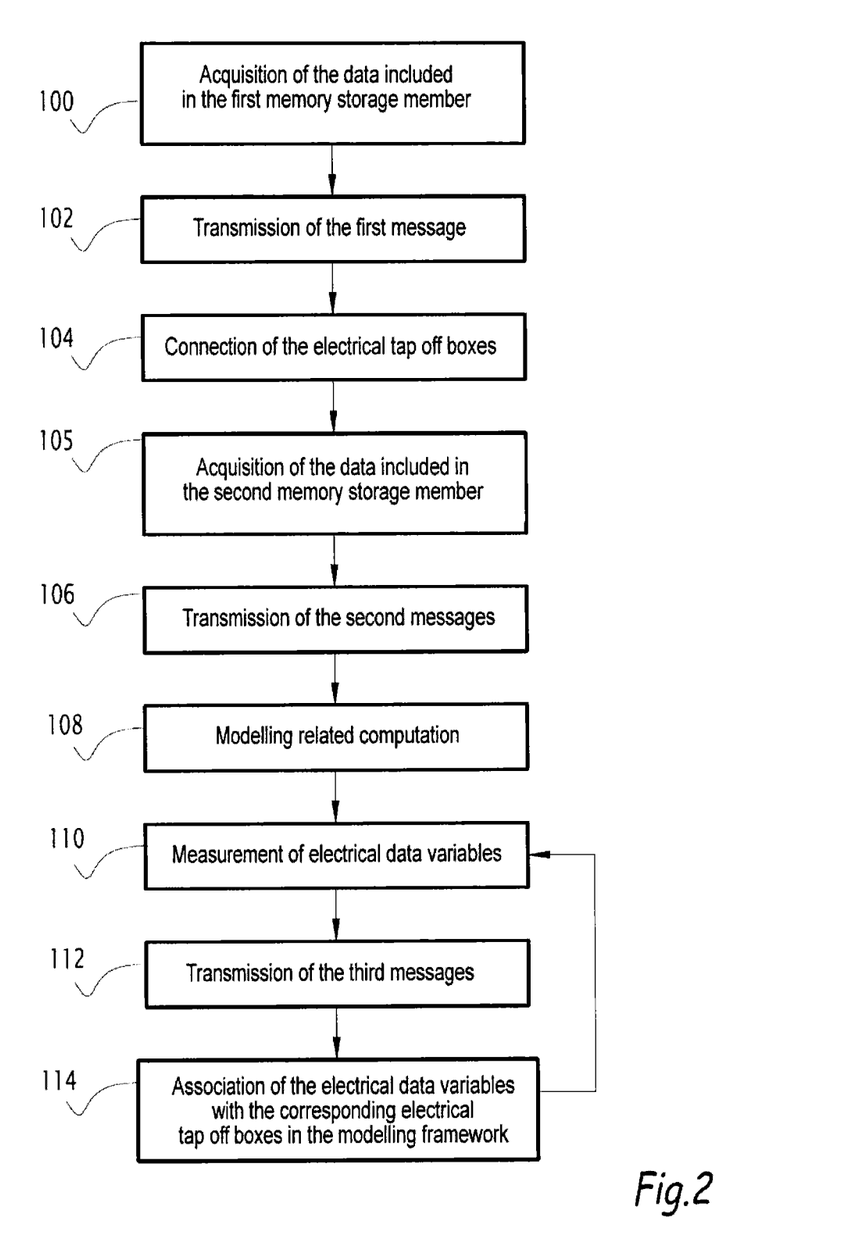
FIG. 2 is a flowchart of a method for managing the electrical installation shown in FIG. 1, according to the invention.

In addition, the method shown in FIG. 2 is implemented by a computer.

More generally, in the description provided here above, the second identification member 43 is a module for communication with each first memory storage member 28.

Thus, the identification member 43, the first 28 and the second 32 memory storage members and the computing unit 26 are the electronic means that participate in the implementation of the method represented in FIG. 2.

The characteristic features of the various different embodiments and variants envisaged here above may possibly be combined with each other.

The invention claimed is:

1. An installation management method for managing an electrical installation comprising a plurality of electrical elements in order to ensure the flow of a current from a point of origin to a point of electrical power distribution, the electrical elements being prefabricated electrical elements capable of being assembled with each other in order to form the electrical installation, each respective element comprising a first memory for storing a unique first identifier associated with said respective element, the method comprising:
   a) acquiring, via an identification member, of a first identifier of each element belonging to the installation, wherein each first memory is also capable of saving and storing geometrical data of the corresponding element, the geometrical data being acquired during the data acquiring step a), via the identification member, and associated with the corresponding first identifier, and
   wherein the method further includes:
   a1) setting in position and assembling the electrical elements to ensure the flow of current from the point of origin to the point of electrical power distribution, starting from an origin point element corresponding to an electrical power supply unit, up to an end point element disposed opposite to the origin point element relative to the rest of the installation, and
   wherein during acquiring step a), the identification member acquires each first identifier and the associated geometrical data in accordance with an order of setting in position of the electrical elements, the order of setting in position of the electrical elements being a sequence in which the electrical elements are set in position from the origin point element to the end point element, b) computing via a processor, of a modelling of the electrical installation, representing the electrical elements and the way the electrical elements are assembled to each other, based on the geometrical data acquired and on the said order of setting in position of the electrical elements, wherein each electrical element comprises at least two connection ends for connecting to another electrical element, the connection of said electrical element to another electrical element being made between a connection end of said electrical element and a connection end of said other electrical element, the connection ends of said electrical element and of said other electrical element, between which the connection is made, having adjacent positions, the geometrical data including the positions of the connection ends of the corresponding element, in a referential positional frame associated with the electrical installation.

2. An installation management method according to claim 1, wherein the elements comprise at least one electrical power distribution element, each power distribution element having a predetermined number of electrical tap off outlets capable of each being connected to an electrical tap off box, wherein each corresponding first memory includes the number of tap off outlets, and wherein for each power distribution element the computing of the modelling is performed based on the acquired number of tap off outlets.

3. An installation management method according to claim 1, wherein the electrical elements comprise at least one electrical power distribution element, each power distribution element having at least one electrical tap off outlet capable of being connected to an electrical tap off box, wherein the method includes, prior to the computing step b), the following steps:
   a') connecting one or more electrical tap off boxes to one or more tap off outlet(s), each electrical tap off outlet comprising a second memory for storing a unique reference number associated with the said outlet;
   a") acquiring the reference number of each tap off outlet connected to an electrical tap off box.

4. An installation management method according to claim 3, wherein, following the step of acquiring a"), the method includes, for each electrical tap off box, the following step:
   a'") transmitting to the processor the corresponding reference number and a second unique identifier associated with the electrical tap off box, the processor being capable during the step of computing b), of modelling each electrical tap off box and of associating it, within the modelling framework, with the position of the corresponding outlet.

5. An installation management method according to claim 4, wherein subsequent to the step of computing b), the method includes the following steps:
   c) measuring, for each electrical tap off box, one or more electrical data variables related to the electrical installation,
   d) transmitting the one or more measured data variables to the processor,
   e) associating, within the modelling framework, the measured electrical data variables with the corresponding electrical tap off box and with its position in the electrical installation.

6. An installation management method according to claim 1, wherein each first memory includes a radio frequency tag, and wherein, during the acquiring step a), the acquisition of data is carried out by via radio electric waves.

7. An installation management method according to claim 1, wherein each electrical element comprises at least two connection ends, with one thereof being a reference end, the geometrical data comprising the position of the connection ends relative to the reference end, and wherein the processor is capable of calculating the position of each connection end relative to the origin point element.

8. An installation management method according to claim 7, wherein the geometrical data includes information items concerning the shape or form of the corresponding element between the two connection ends.

9. An installation management system for managing an electrical installation comprising a plurality of electrical elements in order to ensure the flow of a current from a point of origin to a point of electrical distribution, the electrical elements being prefabricated electrical elements capable of being assembled with each other in order to form the electrical installation, each respective element comprising a first memory for storing a unique first identifier associated with said respective element, the system comprising:
   an identification member for identifying each element belonging to the installation and configured to acquire the corresponding first identifier,
   wherein each first memory is also configured to save and store geometrical data of the corresponding element, the identification member being configured to acquire the geometrical data and associated the geometrical data with the corresponding first identifier,
   the system being configured to set in position and assemble the electrical elements to ensure the flow of current from the point of origin to the point of electrical power distribution, starting from an origin point element corresponding to an electrical power supply unit, up to an end point element disposed opposite to the origin point element relative to the rest of the installation, and
   wherein acquiring the first identifier, the identification member acquires each first identifier and the associated geometrical data in accordance with an order of setting in position of the electrical elements, the order of setting in position of the electrical elements being a sequence in which the electrical elements are set in position from the origin point element to the end point element, and
   wherein the system further includes a processor for performing the modelling of the installation, representing the electrical elements and the way the electrical elements are assembled to each other, based on the geometrical data acquired by the identification member and on the said order of setting in position of the electrical elements,
   wherein each electrical element comprises at least two connection ends for connecting to another electrical element, the connection of said electrical element to another electrical element being made between a connection end of said electrical element and a connection end of said other electrical element, the connection ends of said electrical element and of said other electrical element, between which the connection is made, having adjacent positions, the geometrical data including the positions of the connection ends of the corresponding element, in a referential positional frame associated with the electrical installation.

10. An installation management system according to claim 9, wherein the electrical elements comprise at least one electrical power distribution element, each power distribution element having at least one electrical tap off outlet capable of being connected to an electrical tap off box, wherein the or each tap off outlet comprises a second memory for storing a unique reference number associated with the said tap off outlet, and wherein each electrical tap off box includes a second identification member capable of acquiring the reference number of the one or more tap off outlets to which the said electrical tap off box is connected.

11. An installation management system according to claim 10, wherein each first and second memory includes radio frequency tags capable of communicating via radio electric waves with the identification member and the second identification member respectively.

\* \* \* \* \*